US006789202B1

United States Patent
Ko et al.

(10) Patent No.: US 6,789,202 B1
(45) Date of Patent: Sep. 7, 2004

(54) METHOD AND APPARATUS FOR PROVIDING A POLICY-DRIVEN INTRUSION DETECTION SYSTEM

(75) Inventors: Cheuk W. Ko, San Jose, CA (US); Jaisook Rho, Palo Alto, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/418,626

(22) Filed: Oct. 15, 1999

(51) Int. Cl.[7] ........................ G06F 11/30; G06F 12/14; H04L 9/00; H04L 9/32
(52) U.S. Cl. ..................................... 713/201; 713/200
(58) Field of Search ................................ 713/201, 200

(56) References Cited

U.S. PATENT DOCUMENTS

| | | | | |
|---|---|---|---|---|
| 5,621,889 A | * | 4/1997 | Lermuzeaux et al. | 713/200 |
| 5,796,942 A | * | 8/1998 | Esbensen | 713/201 |
| 6,321,334 B1 | * | 11/2001 | Jerger et al. | 713/200 |

* cited by examiner

Primary Examiner—Gilberto Barrón
Assistant Examiner—Benjamin E. Lanier
(74) Attorney, Agent, or Firm—Silicon Valley IP Group, PC; Kevin J. Zilka; Christopher J. Hamaty

(57) ABSTRACT

One embodiment of the present invention provides a providing policy-driven intrusion detection system for a networked computer system. This system operates by receiving a global policy for intrusion detection for the networked computer system. This global policy specifies rules in the form of a global security condition for the networked computer system and a global response to be performed in response to the global security condition. The system compiles the global policy into local policies for local regions of the networked computer system. Each local policy specifies at least one rule in the form of a local security condition for an associated local region of the networked computer system and a local response to be performed in response to the local security condition. The system communicates the local policies to local analyzers that control security for the local regions. A local analyzer compiles a local policy into specifiers for local sensors in a local region associated with the local analyzer. These specifiers are communicated to the local computer systems in the local region. This allows local computer systems to implement the local sensors.

4 Claims, 3 Drawing Sheets

METHOD AND APPARATUS FOR PROVIDING A POLICY-DRIVEN INTRUSION DETECTION SYSTEM

BACKGROUND

1. Field of the Invention

The present invention relates to providing security in networked computer systems. More specifically, the present invention relates to a method and an apparatus that provides policy-driven intrusion detection for a large-scale networked computer system.

2. Related Art

As computers become more interconnected, it is becoming increasingly harder to safeguard computer systems from attacks launched across computer networks. Existing intrusion detection techniques can detect attacks to individual hosts and small computer networks. However, as intrusion detection techniques become more advanced, attackers have correspondingly grown more sophisticated. Attackers can make use of network connectivity to launch large-scale coordinated attacks from different locations on a network using different identities. In order to detect such large-scale coordinated attacks, intrusion detection systems need to be able to correlate massive amounts of information gathered from a large number of geographically distributed heterogeneous sources.

Unfortunately, existing intrusion detection systems (IDSs) do not correlate information effectively, or do so in an ad hoc manner. Existing IDSs typically do not provide tools for specifying policies, or if they do, the tools are very labor-intensive and tedious. Policies are typically implemented by manually configuring each computer system on a network to enforce the policy. This makes it hard to ensure that each computer system is configured to enforce a specific policy.

Furthermore, existing IDSs do not scale well. A single centralized global security analyzer that receives data from numerous locations on a large network can quickly become overwhelmed with too much data during a massive larges-cale attack.

Hence, what is needed is a method and an apparatus that allows intrusion detection policies to be specified at a global level, and to be automatically propagated to individual computer systems in a network, so that the individual computer systems are configured to implement the policy.

Additionally what is needed is a method and an apparatus that decentralizes control over a global policy so that a centralized global policy analyzer does not become overwhelmed with too much data.

Another problem in propagating a policy across a large network is that the individual computer systems that are coupled together by the network are typically heterogeneous. Consequently, it may be necessary to communicate with each different type of computer system in a different way.

Hence, what is needed is a method and an apparatus that allows configuration information and other types of information related to network security and intrusion detection to be communicated in a form that can be interpreted across a variety of different computing platforms.

SUMMARY

One embodiment of the present invention provides a providing policy driven intrusion detection system for a networked computer system. This system operates by receiving a global policy for intrusion detection for the networked computer system. This global policy specifies rules in the form of a global security condition for the networked computer system and a global response to be performed in response to the global security condition. The system compiles the global policy into local policies for local regions of the networked computer system. Each local policy specifies at least one rule in the form of a local security condition for an associated local region of the networked computer system and a local response to be performed in response to the local security condition. The system communicates the local policies to local analyzers that control security for the local regions. A local analyzer compiles a local policy into specifiers for local sensors in a local region associated with the local analyzer. These specifiers are communicated to the local computer systems in the local region. This allows local computer systems to implement the local sensors.

In one embodiment of the present invention, each specifier for each local sensor specifies at least one security condition and at least one security response.

In one embodiment of the present invention, the system additionally receives security information specifying the local security condition at the local analyzer from the local sensors. The system uses the local policy to determine the local response to the local security condition, and sends information specifying the local response to the local sensors. Note that this local response can specify different responses for each of the local sensors.

In one embodiment of the present invention, the system additionally receives security information specifying the local security condition at the local analyzer from the local sensors, and sends information specifying the local security condition to a global analyzer, which facilitates enforcement of the global policy.

In one embodiment of the present invention, the system additionally receives security information at a global analyzer from the local analyzers. This security information specifies the global security condition. The system uses the global policy to determine the global response to the global security condition, and sends information specifying the global response from the global analyzer to the local analyzers.

In one embodiment of the present invention, the global response can specify different local responses for each of the local analyzers.

In one embodiment of the present invention, the local response can specify one of, terminating an intruding process, denying an intrusive operation, and filtering accesses to a computer system.

In one embodiment of the present invention, the specifiers for the local sensors are communicated in a platform-independent description language.

In one embodiment of the present invention, the global policy is received from a network security coordinator.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Networked Computer System

Figure 1:
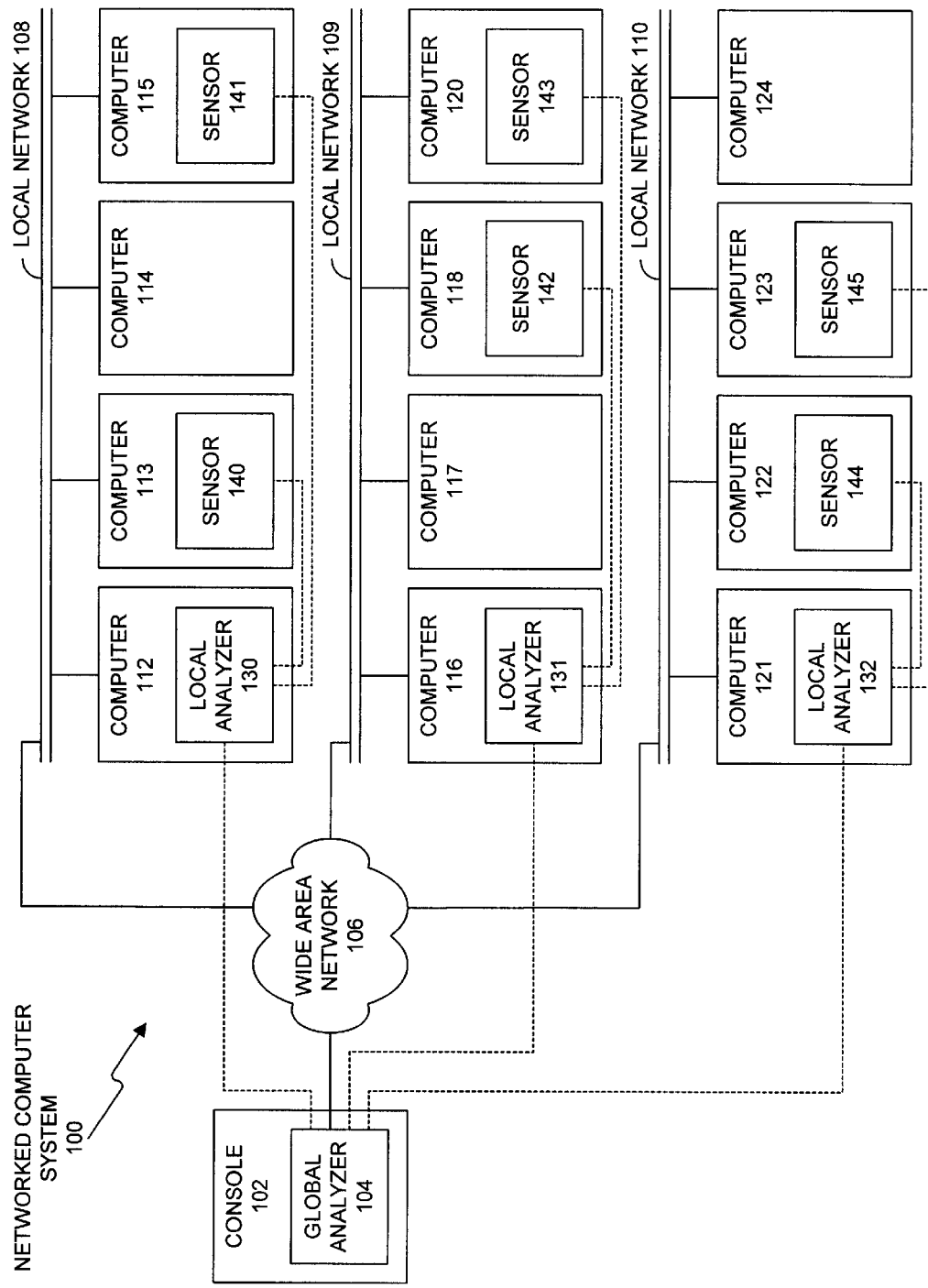
FIG. 1 illustrates a networked computer system in accordance with an embodiment of the present invention.

FIG. 1 illustrates a networked computer system 100 in accordance with an embodiment of the present invention. Networked computer system 100 includes console 102, which is coupled to local networks 108–110 through wide area network 106.

Console 102 can include any type of computer system coupled to wide area network 106 that can act as console to control global security within networked computer system 100. Console 102 includes global analyzer 104, which is an application program in charge of configuring, monitoring and taking actions involved in providing security within networked computer system 100.

Wide area network 106 can include any type of communication channel that can be used to couple together local networks 108–110 and console 102. This includes, but is not limited to, communication channels based on electrical conductors, fiber-optic cables, radio waves and infrared communication channels. In one embodiment of the present invention, wide area network 106 includes the Internet.

Local networks 108–110 couple together computer systems 112–124. More specifically, local network 108 couples together computer systems 112–115, local network 109 couples together computer systems 116–120, and local network 110 couples together computer systems 121–124. Note that local networks 108–110 can include local area networks, such as an Ethernet, or collections of local area networks. Alternatively, local networks 108–110 can include local regions of wide area network 106. Local networks 108–110 can also comprise computer systems associated with subdivisions of an organization (which are not necessarily located in close proximity to each other). Hence, the division of networked computer system 100 into local networks 108–110 can be a logical division or a division based on physical proximity.

Local networks 108–110 include local analyzers 130–132. More specifically, local network 108 includes local analyzer 130 within computer system 112, local network 109 includes local analyzer 131 within computer system 116 and local network 110 includes local analyzer 132 within computer system 122. Local analyzers 130–132 gather information related to computer system security and can take actions based upon a set of local rules in order to implement a global security policy.

Local analyzers 130–132 communicate with sensors 140–145 located within computer systems 113, 115, 118, 120, 122, 123. More specifically, local analyzer 130 communicates with sensor 140 within computer system 113 and sensor 141 within computer system 115. Local analyzer 131 communicates with sensor 142 within computer system 118 and sensor 143 within computer system 120. Finally, local analyzer 132 communicates with sensor 144 within computer system 122 and sensor 145 within computer system 123.

Note that computer systems 114, 117 and 124 do not include analyzers or sensors. This reflects the fact that sensors and analyzers are typically only deployed in computer systems that function as critical servers within networked computer system 100. Other non-critical computer systems do not require sensors or analyzers.

Global analyzer 104 within console 102 communicates with local analyzers 130–132 in order to implement and enforce a global security policy for networked computer system 100. Global analyzer 104 receives a policy, which is compiled into local policies for local analyzers 130–131. Local analyzers 130–132 compile their local policies into specifications for local sensors 140–145. Local sensors 140–145, which are implemented within computer systems 113, 115, 116, 120, 122 and 123, respectively.

When local sensors 140–145 receive security information, the security information is relayed back to local analyzers 130–132. Local analyzers 130–132 filter this information and relay it back to global analyzer 104.

Using this security information, global analyzer 104 determines a response and communicates the response back to local analyzers 130–132. Local analyzers use local policies to form local responses and communicate the local responses to local sensors 140–145.

Although the embodiment of the present invention illustrated in FIG. 1 presents a two-level configuration for implementing a network security policy, the present invention can be applied to systems with more than two levels.

Note that console 102 can actually be located within a computer system within local networks 108–110. Also note that local analyzers 130–132 can be located in the same computer system as a sensor.

Analyzer and Sensor Structure

Figure 2:
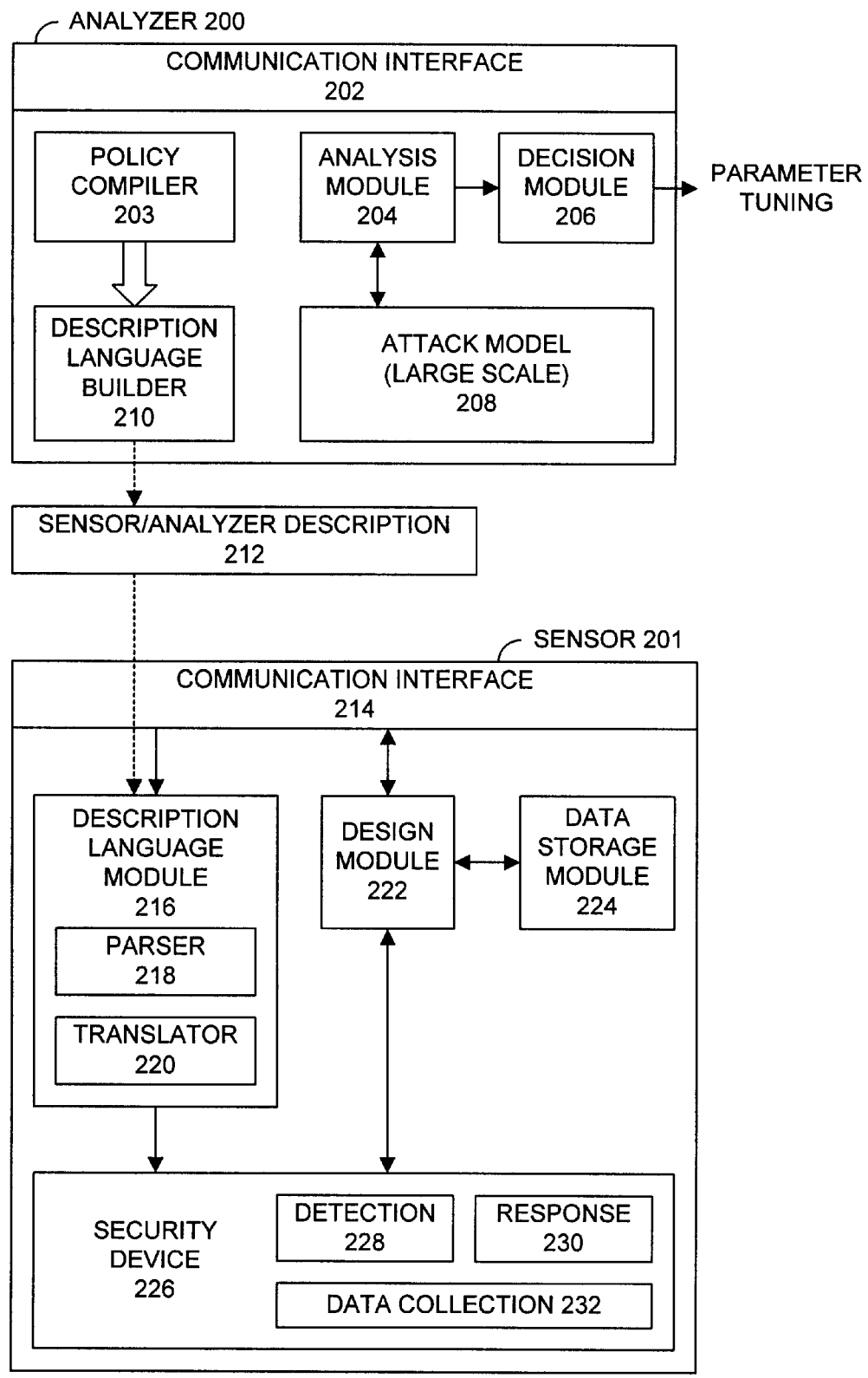
FIG. 2 illustrates the internal structure of an analyzer and a sensor in accordance with an embodiment of the present invention.

FIG. 2 illustrates the internal structure of an analyzer 200 and a sensor 201 in accordance with an embodiment of the present invention. Analyzer 200 can be a global analyzer, such as global analyzer 104, or a local analyzer, such as local analyzers 130–132. Analyzer 200 includes communication interface 202, policy compiler 203, analysis module 204, decision module 206, attack model 208 and description language builder 210.

Communication interface 202 can include a graphical user interface, or any other type of tool that facilitates communication with analyzer 200. In one embodiment of the present invention, communication interface 202 includes a CIDF-compliant communication interface.

Analyzer 200 typically receives an intrusion detection policy from a higher-level analyzer or a network security coordinator. Policy compiler 203 compiles this intrusion detection policy into lower-level intrusion detection policies for local analyzers and/or sensors. Description language builder 210 converts the lower-level policies into a description in a platform-independent description language that can be used to configure lower-level analyzers and/or sensors.

For example, description language builder may produce sensor/analyzer description 212 that can be communicated to lower-level analyzers and/or sensors. Sensor/analyzer description 212 can specify a security state for networked computer system 100. For example, the system can be in a normal state, an emergency state, or a recovery state. The state may also indicate that a critical sensor has been attacked. Sensor/analyzer description 212 can also specify parameters. For example, to prevent door knob rattling attacks, sensor/analyzer description 212 can specify the number of password tries to that are allowed in a specific time interval. These parameters can be changed to more conservative values during an attack. Sensor/analyzer description 212 can additionally specify responses, which are discussed in more detail below.

Analysis module 204 gathers and correlates information reported by sensors and lower-level analyzers to infer occurrences of large-scale attacks. This correlation is based on attacks specified in the intrusion detection policy for analyzer 200 as well as the methods provided by attack model 208.

The results generated by analysis module 204 are sent to decision module 206, which carries out the appropriate response based upon the given intrusion detection policy. For example, when analyzer 200 detects a large-scale attack, analyzer 200 may tune sensors, or lower-level analyzers responsible for the network components that are likely targets for future attacks, to detect and respond to the attacks.

In FIG. 2, sensor analyzer description 212 feeds into sensor 201 through communication interface 214. Note that if analyzer 200 is a higher-level analyzer, sensor/analyzer description 212 can feed into a lower-level analyzer.

Sensor 201 is a local intrusion detection component that monitors activity in an assigned portion of networked computer system 100. Sensor 201 can be configured dynamically by analyzer 200 to detect specific security-related events and local intrusions within the assigned portion of networked computer system 100. Sensor 201 can additionally be tuned to quickly react to on-going large-scale intrusions in a manner that is consistent with a global policy.

Different sensors can include different intrusion detection and response capabilities. A sensor, such as sensor 201, can be constructed from a host-based intrusion detection system (IDS), a network sniffer, a firewall or a wrapper that intercepts the arguments of system calls. This makes it possible to reuse existing intrusion detection capabilities on networked computer system 100 in order to implement a system that enforces global intrusion detection policies.

Sensor 201 includes communication interface 214, description language module 216, decision module 222, data storage module 224 and security device 226. Communication interface 214 can include any other type of mechanism that facilitates communication with analyzer 200. In one embodiment of the present invention, communication interface 214 includes a CIDF compliant communication interface to communicate with other components.

Description language module receives sensor/analyzer description 212. Sensor/analyzer description 212 is parsed (within parser 218) and translated (within translator 220) into a device-specific configuration for instructing security device 226 to perform the specified intrusion detection and response. For example, in a sensor based upon a Cybercop server, description language module 216 translates sensor/analyzer description 212 into a Cybercop-specific attack signature representation. When Cybercop detects the actions specifies in sensor/analyzer description 212, decision module 222 performs the actions specified in sensor/analyzer description 212. Some possible actions include, reporting the attack, storing the attack in data storage module 224 for later retrieval, killing the intruding process, filtering future packets associated with the attacks (in a router or a firewall), denying the intrusive operation (such as access to a file or a network) or reconfiguring sensor 201. Note that security device 226 can include an existing security device, which may include detection resources 228 for detecting an intrusion, response resources 230 for responding to an intrusion, and data collection resources 232 for collecting data related to an intrusion.

Process of Facilitating a Security Policy

Figure 3:
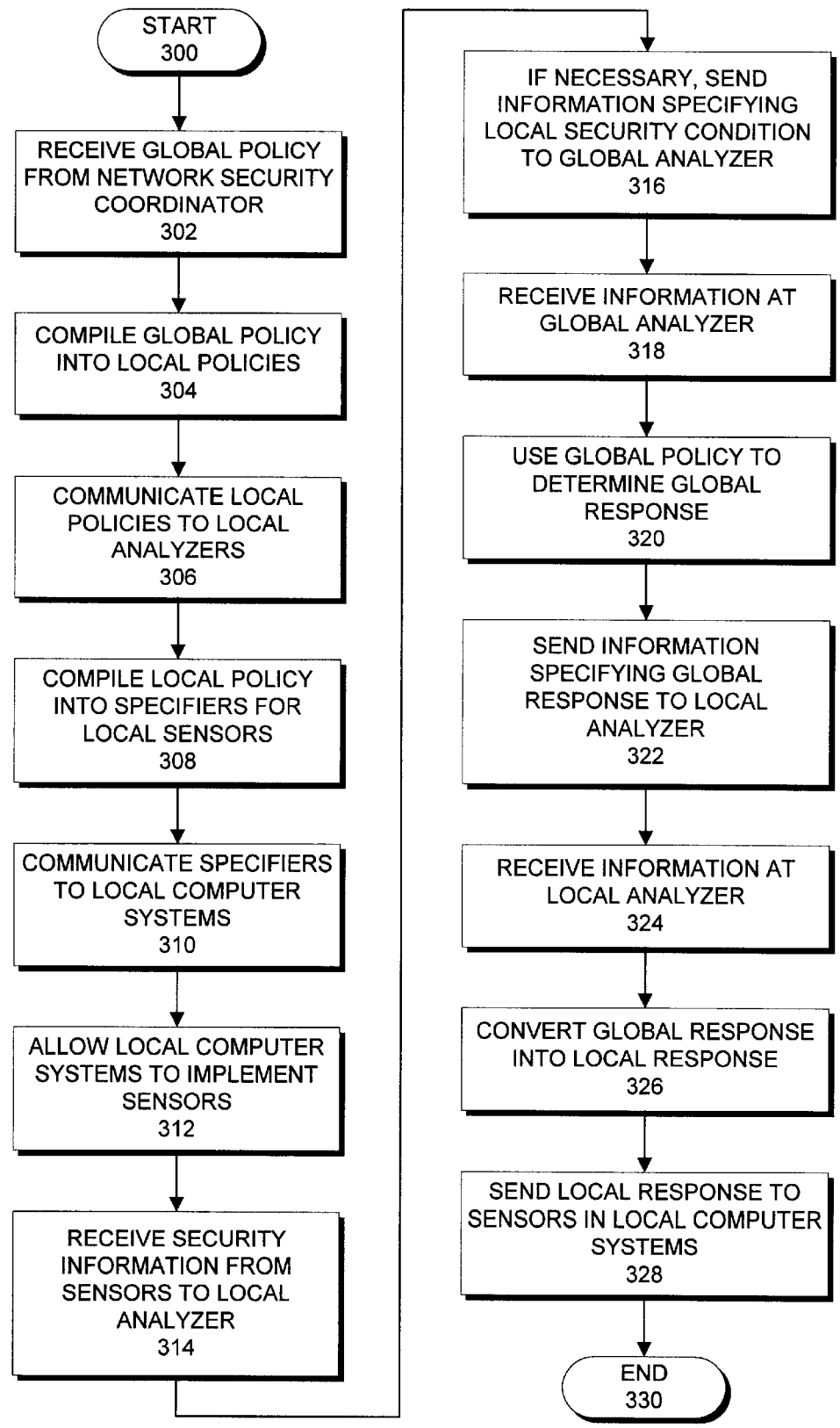
FIG. 3 is a flow chart illustrating the process of providing a security policy in accordance with an embodiment of the present invention.

FIG. 3 is a flow chart illustrating the process of facilitating a security policy in accordance with an embodiment of the present invention. The system starts by receiving a global policy for intrusion detection at global analyzer 104 within console 102 (see FIG. 1) (step 302). This global policy can be received from a network security coordinator through a graphical user interface or through any other means for receiving a global policy. Global analyzer 104 compiles the global policy into a plurality of local policies for local analyzers 130–132 (step 304). These local policies are communicated across wide area network 106 to local analyzers 130–132 (step 306). Within local analyzers 130–132 these policies are compiled into specifiers for local sensors 140–144 (step 308). These specifiers are then communicated to local sensors 140–145 within local computer systems 113, 115, 118, 120, 122, and 123, respectively (step 310). This corresponds to analyzer 200 in FIG. 2 sending sensor/analyzer description 212 to sensor 201. The system then allows local sensors 140–145 to implement the specified sensors (step 312).

At some time in the future during normal operation of networked computer system 100, local analyzers 130–132 receive security information from local sensors 140–145 (step 314). Local analyzers 130–132 examine this security information, and if necessary, send information specifying a local security condition to global analyzer 104 (step 316). Note that local analyzers 130–132 filter the security information, and only send globally important security information to global analyzer 104. This prevents global analyzer 104 from becoming overwhelmed by security information from sensors 140–145.

Global analyzer 104 next receives the security information from local analyzers 130–132 (step 318). Global analyzer 104 uses this information to determine a global security condition. This global security condition is analyzed using the global policy to determine a global response to the global security condition (step 320). Global analyzer 104 next sends information specifying a global response to local analyzers 130–132 (step 322). This global response information is sent to local analyzers 130–132 (step 324). Local analyzers 130–132 receive this global response information (step 324) and convert the global response into local responses (step 326). Note that the global response may already be divided into a set of local responses for local analyzers 130–132. Alternatively, local analyzers 130–132 may determine a local response from global response information.

Local analyzers 130–132 send their local responses to sensors 140–145 within local computer systems 113, 115, 118, 120, 122 and 123 (step 328). The local responses may involve tuning network security parameters or performing different security functions.

Example of Facilitating a Security Policy

For example, consider a security policy specifying that if two critical servers are attacked within networked computer system 100, the system should cut off external accesses to critical servers within networked computer system 100. This global policy is broken down into local policies specifying that attacks to critical servers should be reported to global analyzer 104. These local policies are propagated to local analyzers 130–132 and then to sensors 140–145. Sensors 140–145 are then configured to report attacks to critical servers to local analyzers 130–132, which forward the reports to global analyzer 104.

When global analyzer 104 receives two reports of attacks to critical servers, global analyzer 104 sends a response to local analyzers 130–132 to cut off external accesses to critical servers. Local analyzers 130–132 propagate the response to sensors 140–145.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for providing policy-driven intrusion detection in a networked computer system, comprising:
   receiving a global policy for intrusion detection for the networked computer system, the global policy specifying at least one rule in the form of a global security condition for the networked computer system and a global response to be performed in response to the global security condition;
   wherein the global policy is received from a network security coordinator;
   wherein the global response can specify different local responses for each of the plurality of local analyzers;
   compiling the global policy into a plurality of local policies for a plurality of local regions of the networked computer system, wherein each local policy specifies at least one rule in the form of a local security condition for an associated local region and a local response to be performed in response to the local security condition, wherein the local response can specify one of, terminating an intruding process, and denying an intrusive operation;
   wherein the local response can specify different responses for each of the plurality of local sensors;
   communicating the plurality of local policies to the plurality of local analyzers that control security for the plurality of local regions, wherein the local analyzers perform an action based on the at least one rule, in accordance with one of the local policies;
   compiling a local policy at a local analyzer into a plurality of specifiers for a plurality of local sensors in a local region associated with the local analyzer;
   communicating the plurality of specifiers to a plurality of local computer systems in the local region;
   allowing the plurality of local computer systems to implement the plurality of local sensors specified by the plurality of specifiers;
   wherein each specifier for each local sensor specifies at least one security condition and at least one security response;
   receiving security information specifying the local security condition at the local analyzer from at least one local sensor;
   sending information specifying the local security condition to a global analyzer, the global analyzer facilitating enforcement of the global policy;
   receiving security information at a global analyzer from at least one local analyzer, the security information specifying the global security condition;
   using the global policy to determine the global response to the global security condition; and
   sending information specifying the global response from the global analyzer to at least one local analyzer;
   wherein the global analyzer and the local analyzers each include a communication interface, a policy compiler, an analysis module, a decision module coupled to the analysis module, an attack model coupled to the analysis module, and a description language builder coupled to the policy compiler;
   the communication interface including a graphical user interface that facilitates communication;
   the policy compiler compiling intrusion detection policies into lower-level intrusion detection policies;
   the description language builder converting the lower-level intrusion detection policies into a description in a platform-independent description language that is used for:
      specifying a security state for the networked computer system including a normal state, an emergency state, and a recovery state,
      indicating whether a critical sensor has been attacked, and
      specifying parameters including a number of password tries
   that is allowed in a specific time interval;
   the analysis module gathering and correlating information reported by the sensors and the local analyzers to infer occurrences of large-scale attacks;
   the decision module receiving results generated by the analysis module and carrying out an appropriate response including tuning the local analyzers and the sensors;
   the sensors each including a communication interface, a description language module, a design module, a data storage module coupled to the description module, and a security device coupled to the description language module and the design module:
   the description language module of the sensors each adapted for:
   receiving sensor descriptions,
   parsing the sensor descriptions, and
   translating the sensor descriptions into a specific attack signature representation.

2. The method of claim 1, wherein the plurality of local computer systems, includes at least one of, a general purpose computer system, a network gateway, a network router, a firewall and a network analyzer.

3. The method of claim 1, wherein the local response can specify terminating an intruding process, denying an intrusive operation, and filtering accesses to a computer system.

4. The method of claim 1, wherein the plurality of specifiers for the plurality of local sensors are communicated in the platform-independent description language.

* * * * *

UNITED STATES PATENT AND TRADEMARK OFFICE
CERTIFICATE OF CORRECTION

| | | |
|---|---|---|
| PATENT NO. | : 6,789,202 B1 | |
| APPLICATION NO. | : 09/418626 | |
| DATED | : September 7, 2004 | |
| INVENTOR(S) | : Ko et al. | |

It is certified that error appears in the above-identified patent and that said Letters Patent is hereby corrected as shown below:

In the claims:
col. 8, line 47, change "description" to --design--.

Signed and Sealed this
Fifteenth Day of March, 2011

David J. Kappos
*Director of the United States Patent and Trademark Office*